US008376837B2

(12) United States Patent
Gagner et al.

(10) Patent No.: US 8,376,837 B2
(45) Date of Patent: Feb. 19, 2013

(54) DISTRIBUTING INFORMATION IN A WAGERING GAME SYSTEM

(75) Inventors: Mark B. Gagner, West Chicago, IL (US); Damon E. Gura, Chicago, IL (US); Craig J. Sylla, Round Lake, IL (US)

(73) Assignee: WMS Gaming, Inc., Waukegan, IL (US)

(*) Notice: Subject to any disclaimer, the term of this patent is extended or adjusted under 35 U.S.C. 154(b) by 278 days.

(21) Appl. No.: 12/678,194

(22) PCT Filed: Sep. 29, 2008

(86) PCT No.: PCT/US2008/078199

§ 371 (c)(1),
(2), (4) Date: Mar. 15, 2010

(87) PCT Pub. No.: WO2009/045972

PCT Pub. Date: Apr. 9, 2009

(65) Prior Publication Data

US 2010/0222134 A1 Sep. 2, 2010

Related U.S. Application Data

(60) Provisional application No. 60/976,452, filed on Sep. 30, 2007.

(51) Int. Cl.
*A63F 13/00* (2006.01)
*A63F 13/10* (2006.01)

(52) U.S. Cl. ................ 463/25; 463/16; 463/20; 463/29; 463/42; 273/138.1; 273/139

(58) Field of Classification Search ............. 463/10–13, 463/16, 20–22, 25, 29, 40–42; 273/138.1, 273/139, 142 B, 142 A, 142 J, 148 A, 149 P, 273/149 R, 243, 292–293, 304, 306, 309; *A63F 13/00, 13/10*
See application file for complete search history.

(56) References Cited

U.S. PATENT DOCUMENTS

| | | | | |
|---|---|---|---|---|
| 5,618,232 | A * | 4/1997 | Martin | 463/25 |
| 6,129,632 | A * | 10/2000 | Luciano | 463/12 |
| 6,375,567 | B1 | 4/2002 | Acres | |
| 6,913,532 | B2 | 7/2005 | Baerlocher et al. | |
| 2005/0130728 | A1 | 6/2005 | Nguyen et al. | |
| 2005/0130737 | A1 | 6/2005 | Englman et al. | |
| 2005/0159207 | A1 | 7/2005 | Thomas | |
| 2007/0243925 | A1 * | 10/2007 | LeMay et al. | 463/20 |
| 2008/0248844 | A1 * | 10/2008 | Gadda et al. | 463/1 |

FOREIGN PATENT DOCUMENTS

WO WO2009045972 4/2009

OTHER PUBLICATIONS

"PCT Application No. PCT/US08/78199 International Preliminary Report on Patentability", Sep. 14, 2010 , 4 pages.
"PCT Application No. PCT/US08/78199 International Search Report", Dec. 8, 2008 , 9 pages.

* cited by examiner

*Primary Examiner* — Arthur O. Hall
(74) *Attorney, Agent, or Firm* — DeLizio Gilliam, PLLC

(57) ABSTRACT

The patent application describes techniques for distributing information in a wagering game system. One method includes identifying one or more components to notify about events occurring in a wagering game system, where the one or more components facilitate secondary wagering games. The method can also include detecting the events, where some of the events arise from presenting primary wagering games. The method can also include reporting the events to the one or more components. The method can also include determining results for one or more of the secondary wagering games; and transmitting the results for presentation.

15 Claims, 11 Drawing Sheets

DISTRIBUTING INFORMATION IN A WAGERING GAME SYSTEM

RELATED APPLICATIONS

This application claims the priority benefit of U.S. Provisional Application Ser. No. 60/976,452 filed Sep. 30, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to processing wagers in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises identifying one or more components to notify about events occurring in a wagering game system, wherein the one or more components facilitate secondary wagering games; detecting the events, wherein some of the events arise from presenting primary wagering games; reporting the events to the one or more components; determining results for one or more of the secondary wagering games; and transmitting the results for presentation.

In some embodiments, at least one of the events indicates a wager associated with the one of the primary wagering games.

In some embodiments, each of the secondary games is funded by a wager made in association one or more of the primary wagering games.

In some embodiments, the method further comprises reporting the results for use in updating one or more player account balances.

In some embodiments, results of the plurality of primary wagering games and the plurality of bonus wagering games are presented on a remote wagering game terminal.

In some embodiments, a method comprises detecting a first winning event associated with a first wagering game, wherein the first winning event indicates a first monetary award, and wherein a first credit meter is associated with the first wagering game; detecting a second winning event associated with a second wagering game, wherein the second winning event indicates a second monetary award, and wherein a second credit meter is associated with the second wagering game; transmitting indications of the first monetary award and the second monetary award; receiving new values for the first credit meter and the second credit meter, wherein the first credit meter and second credit meter appear on a remote wagering game terminal; and transmitting content for use in displaying the new values on the remote wagering game terminal.

In some embodiments, the first and second credit meters indicate wagers made and wagers won in association with the first and second wagering games.

In some embodiments, content representing the first wagering game and content representing the second wagering game appear at the same time on the remote wagering game terminal.

In some embodiments, an accounting server determines the new values.

In some embodiments, the remote wagering game terminal includes components for processing the content and displaying the new values.

In some embodiments, a method comprises detecting an event associated with a primary wagering game, wherein presentation of the primary wagering game occurs on a remote wagering game terminal; selecting one of a plurality of secondary wagering games, wherein the one of the plurality of secondary wagering games is compatible with the primary wagering game; launching a component to facilitate the selected secondary wagering game; and transmitting, to the wagering game terminal, information indicating a result for the selected secondary wagering game.

In some embodiments, the method further comprises transmitting an indication of the result for use in updating a player account balance; receiving an updated player account balance; transmitting, to the wagering game terminal, an indication of the player account balance.

In some embodiments, the method further comprises providing the result to a second component, wherein the second component facilitates the presentation of the primary wagering game.

In some embodiments, the one of the plurality of secondary wagering games is selected based on the event.

In some embodiments, each of the plurality of secondary wagering games is different.

In some embodiments, the plurality of secondary wagering games are not available for selection until after detection of the event.

BRIEF DESCRIPTION OF THE FIGURES

Embodiments of the invention are illustrated in the Figures of the accompanying drawings in which.

DESCRIPTION OF THE EMBODIMENTS

Figure 1:
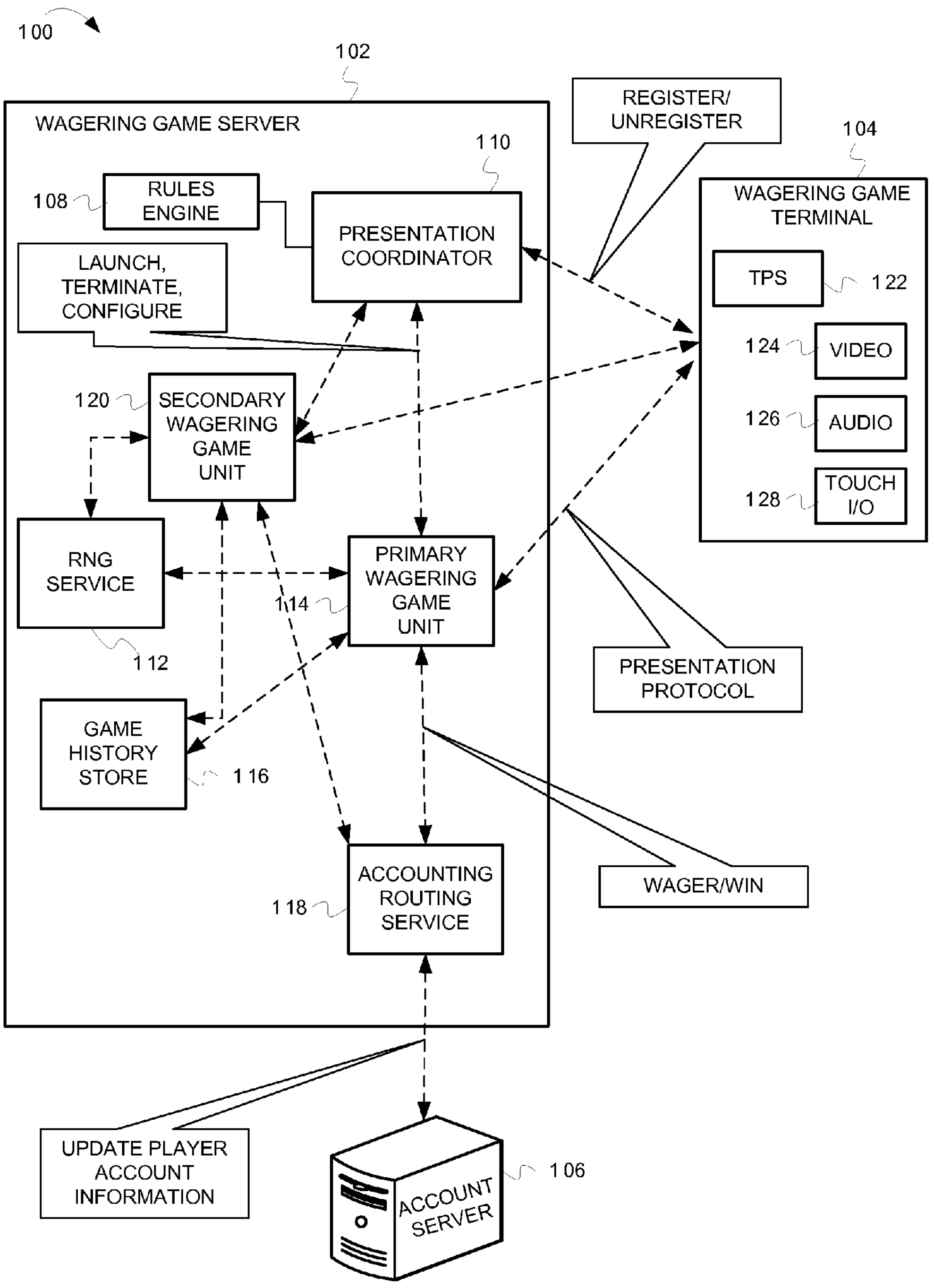
FIG. 1 is a block diagram illustrating a system that conveys information between primary and secondary wagering games according to some embodiments of the invention.

This description of the embodiments is divided into five sections. The first section provides an introduction to embodiments of the invention, while the second section describes an example operating environment. The fourth section describes example wagering game machines in more detail and the fifth section presents some general comments.

Introduction

Wagering game players often desire a variety of wagering game content. Some wagering game designers have enhanced wagering game content by creating primary wagering games that trigger secondary games. For example, designers have created primary slots games that trigger secondary games (a.k.a. bonus games) when certain reel combinations occur (e.g., all cherries). During the secondary games, outcomes are often determined by random selection and displayed on spinning wheels or other indicia that reveal cash awards and other results.

Some embodiments of the invention enhance wagering game content by enabling players to play multiple games simultaneously. For example, embodiments can enable players to play a poker game in the foreground and participate in a keno game in the background. The poker and keno games are completely independent of one another. Similarly, some embodiments enable players to play secondary games that are independent of any primary game. To accomplish these features, some embodiments provide a system that launches and terminates primary and secondary wagering games, communicates wagering information between the primary and secondary wagering games, and updates player financial accounts to reflect wagers and wins. In some instances, instead having primary games initiate the secondary games, the system enables secondary games themselves to initiate "bonus play". Thus, some embodiments of the invention provide an infrastructure through which secondary games "listen for" and respond to certain events occurring in the system (e.g., in primary games). As wagers and winning events occur, the system can update player accounts and credit meters.

Some embodiments of the system enable newly developed secondary games to work with existing primary games. For example, a new secondary game can use the system to interact with existing primary games. This separation between primary and secondary games enables wagering game designers to more rapidly develop new secondary games and to develop secondary games independently of primary games.

These and other features are described in greater detail in the following section.

Operating Environment

This section describes an example operating environment and presents structural aspects of some embodiments. This section also describes operations and communications associated with some embodiments of the invention. In certain embodiments, the operations can be performed by executing instructions residing on machine-readable media (e.g., software), while in other embodiments, the operations can be performed by a combination of software, hardware, and/or other logic (e.g., firmware). In some embodiments, the operations can be performed in series, while in other embodiments, one or more of the operations can be performed in parallel. Moreover, some embodiments can perform less than all the operations shown in the Figures.

In the following discussion, FIG. 1 presents an architecture for some embodiments of the system, whereas FIGS. 2-9 show how the system facilitates different features related to primary games, secondary games, wager processing, and more.

FIG. 1 is a block diagram illustrating a system that conveys information between primary and secondary wagering games according to some embodiments of the invention. In FIG. 1, the system 100 includes a wagering game server 102, account server 106, and wagering game terminal 104. Although FIG. 1 shows only one wagering game terminal, the wagering game server 102 can interact with a plurality of wagering game terminals (e.g., banks of wagering game machines in one or more casinos). Also, in FIG. 1 and other figures, arrows represent communications and/or operations. In some embodiments, the communications may not be bi-directional.

The wagering game server 102 includes a presentation coordinator 110, rules engine 108, random number generator service 112, game history store 116, and accounting routing service 118. The presentation coordinator 110 can configure, launch, and terminate primary wagering game units (114) and secondary wagering game units (120). The primary and secondary wagering game units can present a plurality of wagering game types (e.g., slots, poker, roulette, etc.) and themes (e.g., a movie theme, cartoon theme, etc.). The primary and secondary wagering game units can use the random number generator service 112 for determining wagering game results and the wagering game terminal 104 for presenting game results. The primary and secondary wagering game units can format presentation requests using a presentation protocol understood by the wagering game terminal's terminal presentation service 122. The wagering game server 102 also includes an accounting routing service 118, which can distribute wagering game information (e.g., wager amounts, winning awards, etc.) between primary and secondary wagering game units, the account server 106, and other components of the wagering game system 100. Although FIG. 1 (and other figures) show the primary and secondary wagering game units operating on the wagering game server 102, they can also operate on the wagering game terminals.

The wagering game terminal 104 can be a thick or thin client device including a terminal presentation service 122, video device 124, audio device 126, and touch input/output device 128. The wagering game terminal 104 can be included in wagering game machines or other devices (e.g., cell phones, notebook computers, etc.). When the wagering game terminal 104 initializes, it can register with the presentation coordinator 110 to determine what types of primary and secondary wagering games will be made available on the wagering game terminal. The presentation coordinator 110 can maintain a list of all active wagering game terminals.

Distributing Wagering Game Information to Primary and Secondary Games

This section continues with a discussion about how embodiments can distribute wagering game information (e.g., wagers, monetary awards, etc.) between primary wagering games, secondary wagering games, and other components.

Figure 2:
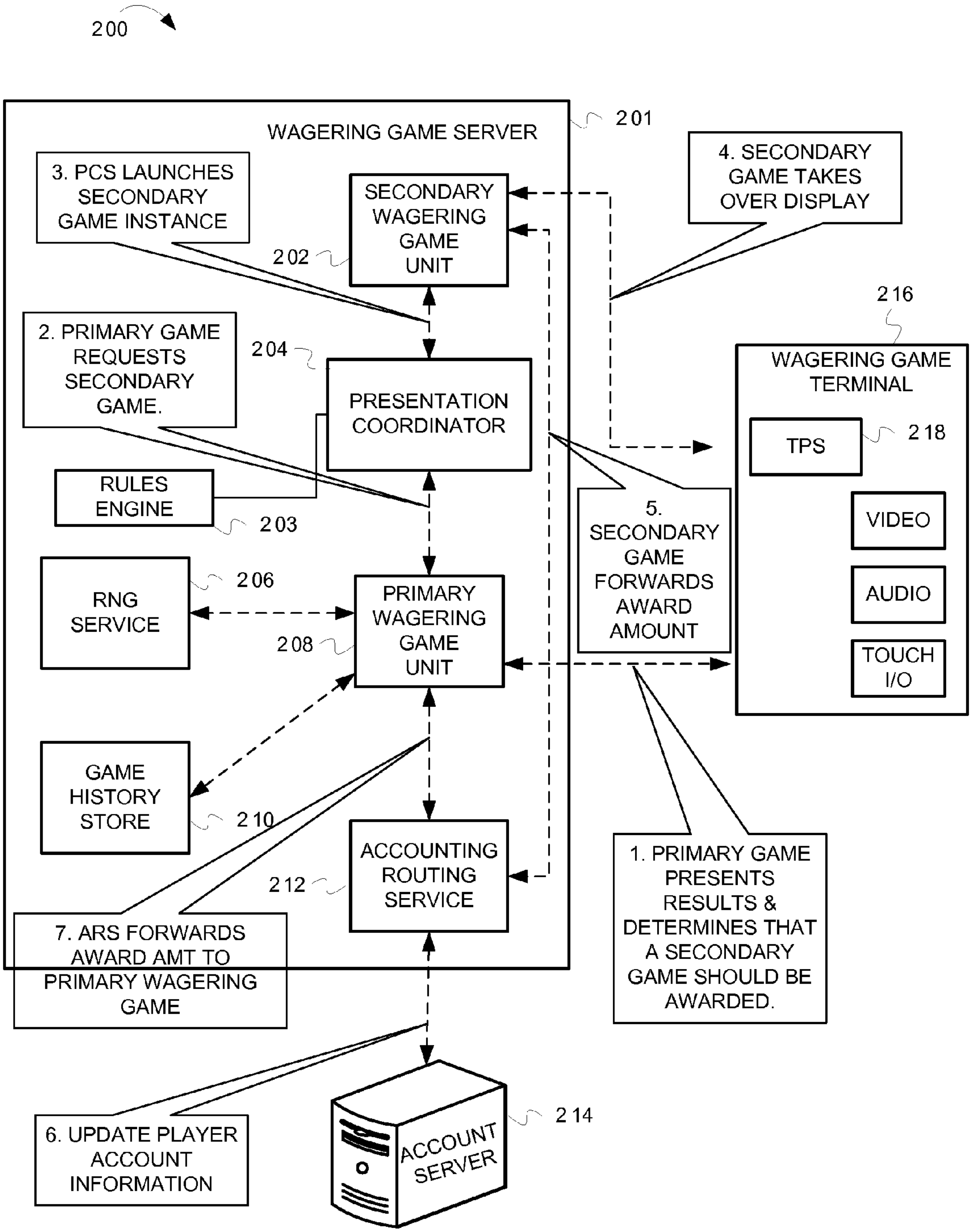
FIG. 2 is a block diagram illustrating system components and operations for conducting secondary wagering games, according to some embodiments of the invention.

FIG. 2 is a block diagram illustrating system components and operations for conducting secondary wagering games, according to some embodiments of the invention. In the discussion of FIG. 2, the secondary wagering games are dependent on events occurring in primary wagering games.

The wagering game system 200 includes a wagering game server 201, wagering game terminal 216, and account server 214. The wagering game server 201 and wagering game terminal 216 include the same components shown in FIG. 1. In FIG. 2, the balloons show operations and communications of the system components. The operations and communications occur in stages.

During stage one, the primary wagering game unit 208 presents wagering game results on the wagering game terminal 216 and determines that a secondary game should be awarded. The primary wagering game unit 208 can award the secondary game based on primary game results, such as a reel combination (slots), a card combination (poker, black jack, etc.), etc.

During stage two, the primary wagering game unit 208 requests that the presentation coordinator 204 launch the secondary wagering game unit 202. During stage three, the presentation coordinator 204 launches an instance of the secondary wagering unit 202. Thus, in some embodiments, the secondary wagering game unit 202 does not reside in the wagering game server's main memory until stage three.

During stage four, the secondary wagering game unit 202 takes control of the wagering game terminal's audio and video output facilities. While controlling the wagering game terminal's output facilities, the secondary wagering game unit 202 presents results of a secondary wagering game on the wagering game terminal 216. For example, the secondary wagering game unit 202 presents a spinning wheel or other indicia indicating a winning result for the secondary game.

During stage five, the secondary wagering game unit 202 forwards an award amount to the accounting routing service 212. During stage six, the accounting routing service 212 forwards the award amount to the account server 214, so the account server 214 can credit the player's account by the award amount During stage seven, the accounting routing service 212 forwards the award amount to the primary wagering game unit 208, so it can update its credit meters and any of its other wager tracking facilities.

Figure 3:
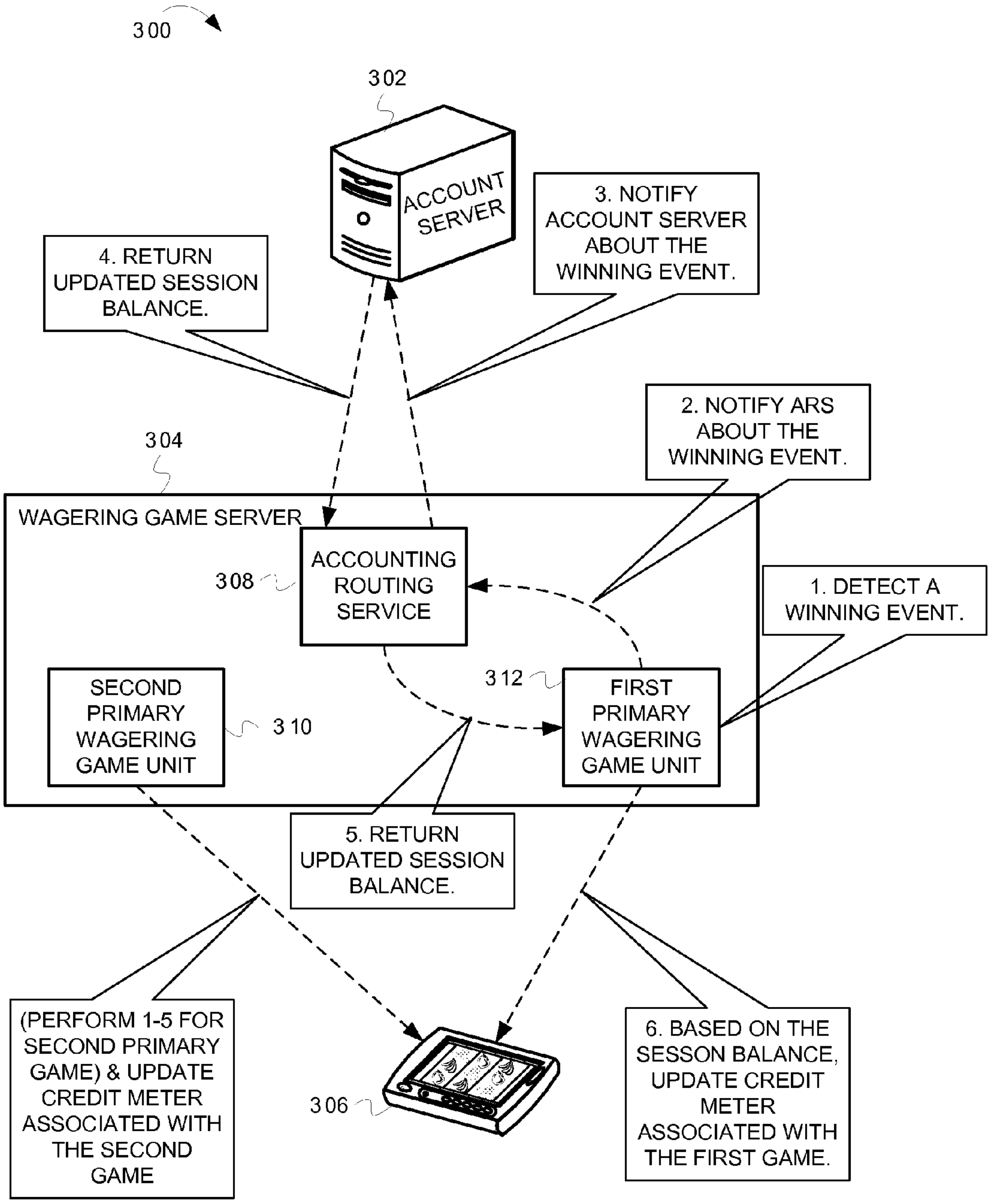
FIG. 3 is a block diagram illustrating system components and operations for presenting a plurality of primary wagering games on a single wagering game terminal, according to some embodiments of the invention.
Figure 4:
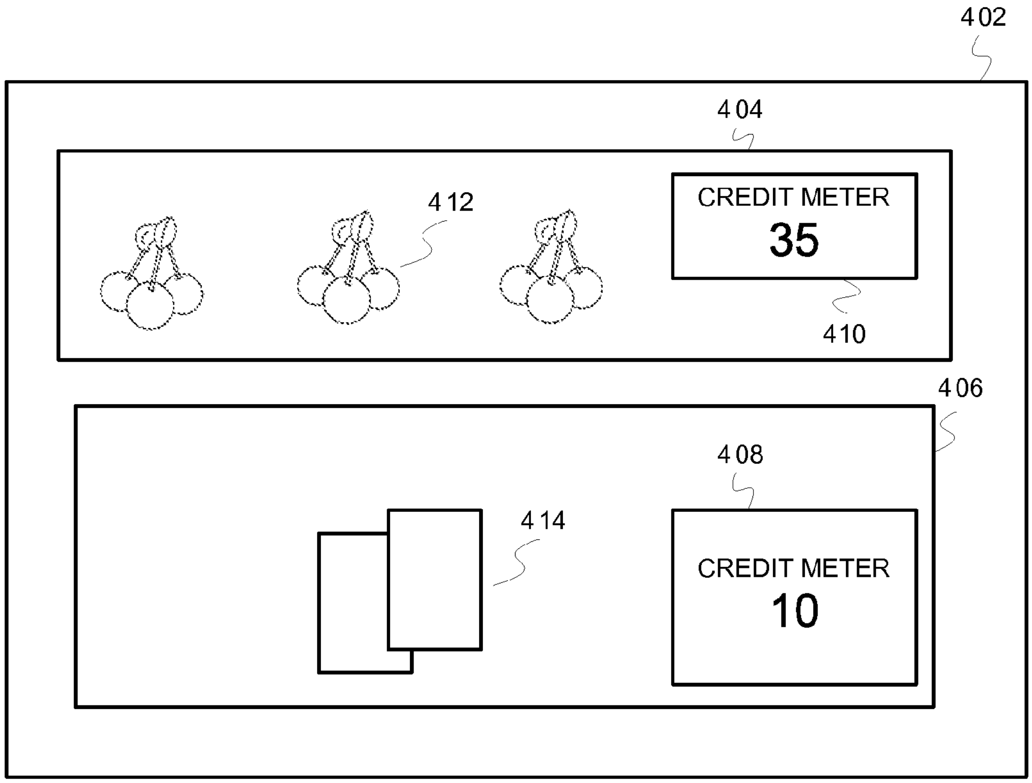
FIG. 4 illustrates how a wagering game terminal interface can show multiple primary games and multiple independent credit meters.

This section continues with a discussion of FIGS. 3 and 4, which show how two primary wagering games can each have independent credit meters. FIGS. 3 and 4 also show how the two primary wagering games can update a player's account.

FIG. 3 is a block diagram illustrating system components and operations for presenting a plurality of primary wagering games on a single wagering game terminal, according to some embodiments of the invention. More specifically, the operations describe how two primary wagering game units can present separate results on a single wagering game terminal, where each primary wagering game unit has an independent credit meter. FIG. 4 illustrates how a wagering game terminal interface can show multiple primary games and multiple independent credit meters. In FIG. 4, the wagering game terminal interface 402 includes a first primary game area 404 and a second primary game area 406. The first primary game area 404 includes graphics 412 indicating results for a first primary wagering game (e.g., a video slots game). The first primary game area 404 also includes a credit meter 410 indicating a credit balance for use in playing the first primary wagering game.

The wagering game terminal interface 402 also includes a second primary game area 406 including graphics showing results of a second primary game and a credit meter 408 showing a credit balance available for use in playing the second primary game. The discussion of FIG. 3 will explain how some embodiments can present multiple primary games, maintain independent credit meters, and update a player account.

In FIG. 3, the wagering game system 300 includes a wagering game server 304, account server 302, and wagering game terminal 306. The wagering game server 304 includes a first primary wagering game unit 312, second primary wagering game unit 310, and accounting routing service 308. The operations occur in stages.

During stage one, the first primary wagering game unit 312 detects a winning event, such as a winning result for a video slots game it presented. After detecting the winning event, the first primary wagering game unit 312 can present indicia (e.g., spinning reels) indicating the winning event on the wagering game terminal 306. During stage two, the primary wagering game unit 312 notifies the accounting routing service 308 about the winning event. The notification can include a monetary amount. During stage three, the accounting routing service 308 notifies the account server 302 about the winning event. In turn, the account server 302 credits a player's session balance and account balance. The session balance can indicate a sum total of wagers and awards for wagering games presented on a particular terminal during a given time. In some embodiments, the session balance can indicate wagers and awards resulting from primary games presented by the first and second primary wagering games units (310 & 312). Alternatively, the account server 302 can maintain a separate session balance for each primary wagering game unit. Thus, each session balance can indicate wagers and awards associated with primary games presented by a particular primary game unit.

During stage four, the account server 302 returns an updated session balance to the accounting routing service 308. During stage five, the accounting routing service 308 returns the updated session balance to the first primary wagering game unit 312. For example, the updated session balance can indicate a sum total of wagers and awards resulting from primary games presented by the first primary wagering game unit 312 (e.g., a value of 35 credits).

During stage six, the first primary wagering game unit 312 updates its credit meter on the wagering game terminal 306 to reflect the new session balance (e.g., see FIG. 4's credit meter 410).

The wagering game server 304 and other components can perform (in parallel, if needed) the operations described above (i.e., stages 1-6) for the second primary wagering game 310. As a result, both the first and second primary wagering games units (312 & 310) can present results on a wagering game terminal, update a player's session and account balances, and update independent credit meters (see also FIG. 4). In some embodiments, the system 300 allows for transfer of value between the independent credit meters.

In some embodiments, the wagering game server 304 can perform these operations for three or more primary wagering games. Furthermore, some embodiments of the wagering game server 304 can scale this concept to work with a plurality of players and wagering game terminals.

Distributing Wagering Game Information to Progressive Games

This section continues with a discussion about embodiments that can distribute wagering game information to progressive wagering games. Progressive wagering games can be funded by wagers made in primary games. For example, a portion of each wager of a slots game feeds the progressive game's jackpot. A large number of primary games can feed a progressive jackpot (e.g., all primary games of a certain theme or in a certain area of the casino), so the progressive jackpot can grow to be relatively large. When a player satisfies the conditions for winning the progressive game, the player receives the progressive jackpot.

Figure 5:
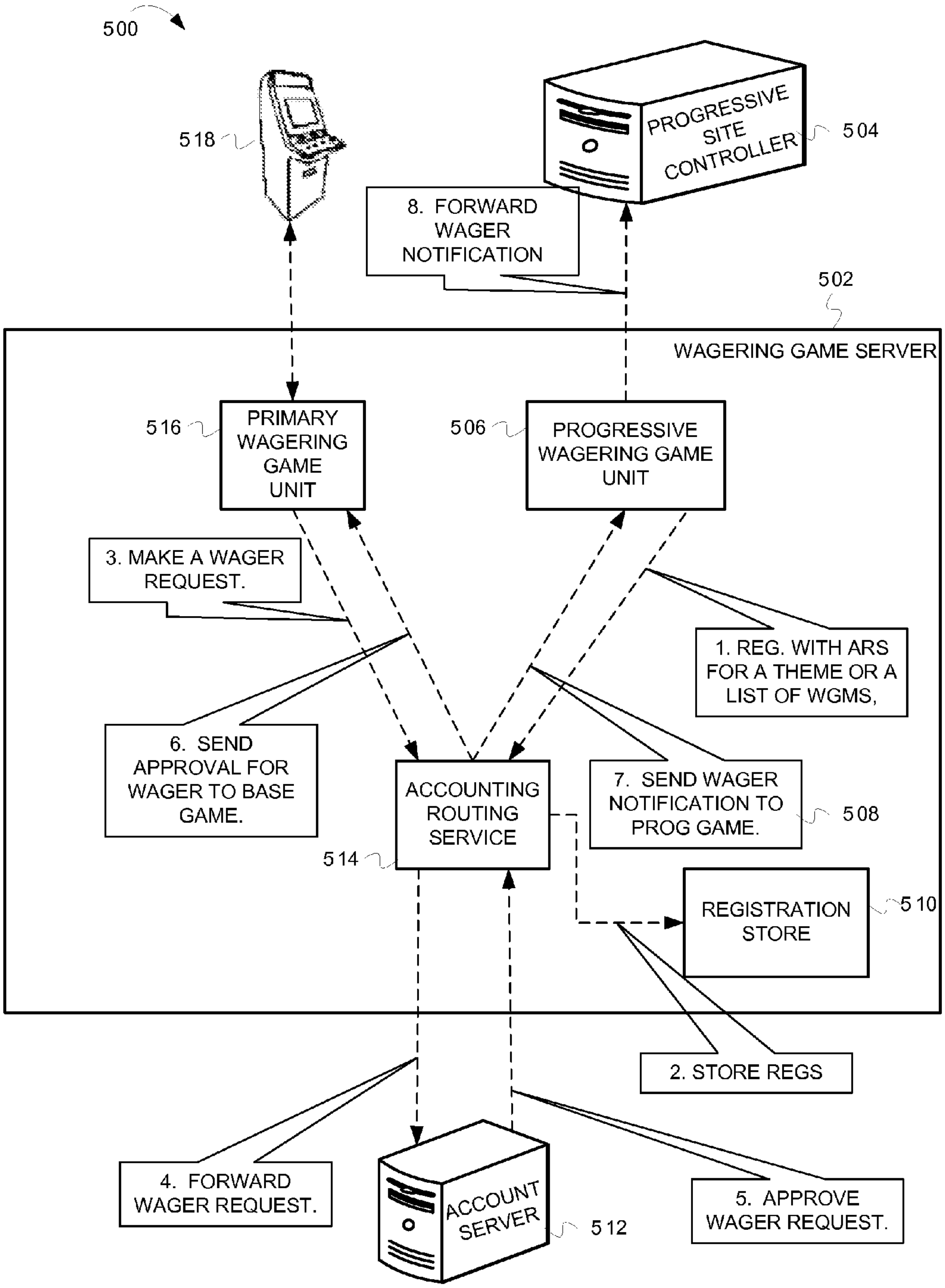
FIG. 5 is a block diagram illustrating system components and operations for distributing wagering game information to progressive wagering games, according to some embodiments of the invention.

FIG. 5 is a block diagram illustrating system components and operations for distributing wagering game information to progressive wagering games, according to some embodiments of the invention. In FIG. 5, the system 500 includes a wagering game server 502, progressive site controller 504, account server 512, and wagering game terminal 518. The wagering game server 502 includes a primary wagering game unit 516, progressive wagering game unit 506, accounting routing service 514, and registration store 510. The operations shown in FIG. 5 occur in eight stages.

During stage one, the progressive wagering game unit 506 registers with the accounting routing service 514 to receive wagering game information from selected wagering games. The wagering game information can indicate wagers placed in the wagering games. The progressive wagering game unit 506 can register to receive wagering game information from other wagering games (primary or secondary) based on any suitable criteria, such as: physical location of a stationary wagering game terminal, relative physical location of a mobile wagering game terminal, game theme selected by the player, game channel selected by the player, player rank, player status, player buy-in, etc. During stage two, the accounting routing service 514 stores the registration information in the registration store 510.

During stage three, the primary wagering game unit 516 makes a wager request to the accounting routing service 514. When a player at the wagering game terminal 518 places a wager associated with the primary wagering game unit 516, the system (e.g., the account server 512) verifies that the player's account (or session account) has enough funds to cover the wager. During stage four, the accounting routing service 514 forwards the wager request the account server 512. During stage five, the account server 512 determines that the player's account can cover the wager, so it sends approval for the wager request to the accounting routing service 514. During stage six, the accounting routing service 514 notifies the progressive wagering game unit 506 about the wager associated with the primary wagering game unit 516.

During stage seven, the accounting routing service 514 sends the approval to the primary wagering game unit 516. During stage eight, the progressive wagering game unit 506 forwards the notification to the progressive site controller 504. In some embodiments, the progressive site controller 504 tracks and increments the jackpot associated with the progressive wagering game unit 506.

While FIG. 5 shows how a progressive jackpot can grow from wagers associated with one wagering game, the wagering game server 502 can host numerous wagering games (each presenting results on a different wagering game terminal). As a result, embodiments of the accounting routing service 514 can forward wagering game information about numerous wagering games to a progressive wagering game unit. The wagering games can be primary or secondary wagering games. Also, the wagering game server 502 can include a plurality of different progressive wagering game units, each registering for wagering game information based on different criteria. Thus, in some embodiments, the system 500 can scale to support the needs of one or more casinos.

Secondary Wagering Game Features

This section continues with a discussion about embodiments that facilitate various secondary wagering game features.

Figure 6:
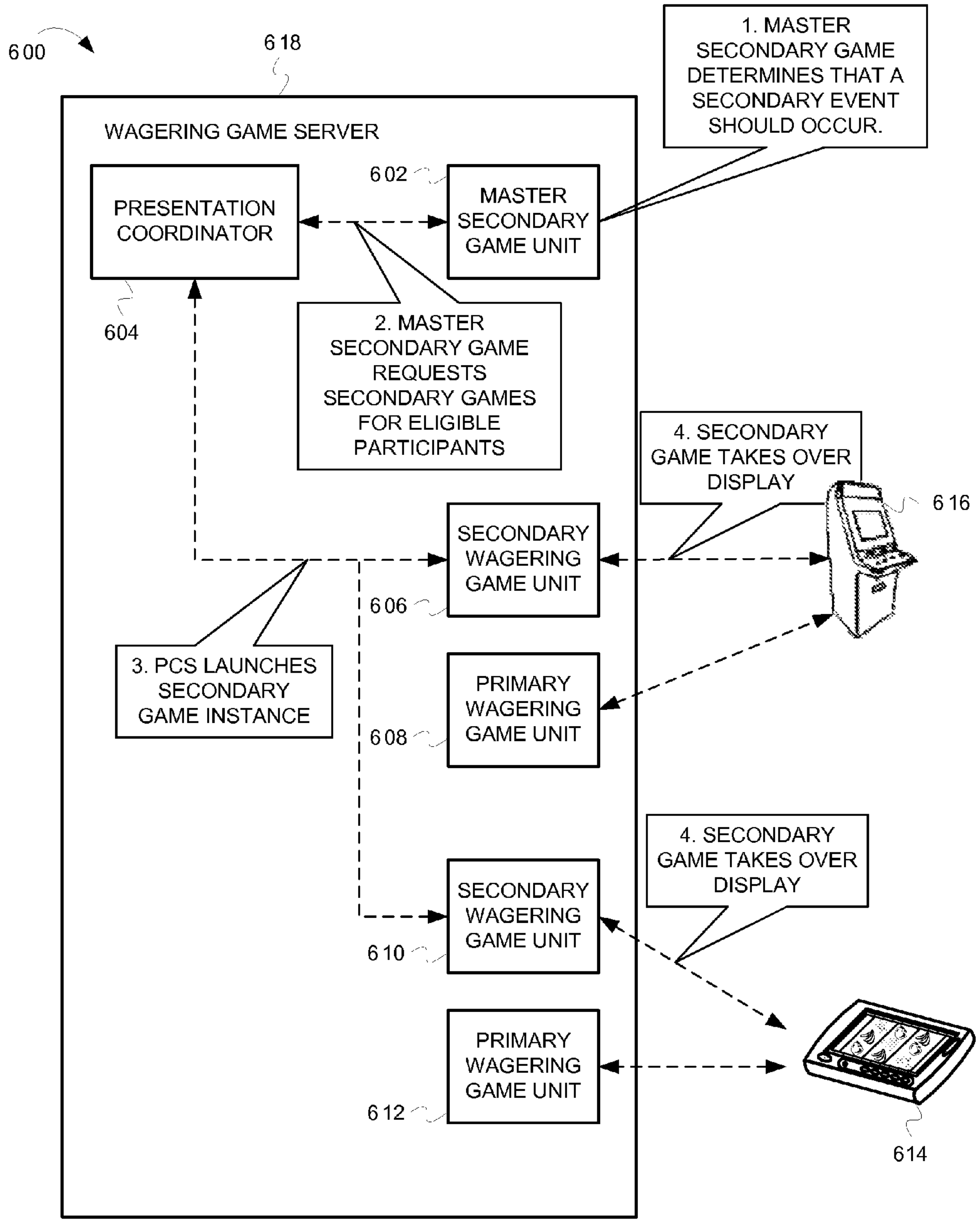
FIG. 6 is a block diagram illustrating system components and operations for conducting independent secondary wagering games, according to some embodiments of the invention.

FIG. 6 is a block diagram illustrating system components and operations for conducting independent secondary wagering games, according to some embodiments of the invention. As shown, the system 600 includes a wagering game server 618 and wagering game terminals 614 & 616. The wagering game server 618 includes a master secondary game unit 602, presentation coordinator 604, and primary wagering game units 608 & 612.

Initially, the primary wagering game units 608 & 612 are conducting wagering games and presenting results on the wagering game terminals 616 & 614. Later, as shown in FIG. 6, the secondary wagering game units 606 & 610 are launched, as described below. The operations occur in four stages.

During stage one, the master secondary game unit 602 decides to initiate secondary game event. The master secondary game unit 602 may decide to initiate the secondary game event based on conditions independent of any primary wagering game. For example, the master secondary game unit 602 can initiate a secondary game event based on who is playing wagering games, the amount of wagers made in a given time, the type of wagering game terminals in use, number of wagering game terminals in a particular area, or when other suitable conditions are satisfied. The master secondary game unit 602 can receive information about conditions occurring in the system 600 from the presentation coordinator 604. In some embodiments, the wagering game server 618 includes an accounting routing service (not shown in FIG. 6). In these embodiments, the primary and secondary wagering games can forward wagering game information (e.g., wager amounts, game results, player choices, social network information, etc.) to the accounting routing service, which can then forward it to the master secondary game unit 602 and other components. In other embodiments, the master secondary game unit 602 can monitor conditions by accessing information from other resources (e.g., an operating system running on the server 618, etc.).

During stage two, the master secondary game unit 602 requests that the presentation coordinator 604 launch secondary wagering games for eligible participants. For example, the master secondary game unit 602 can request that the presentation coordinator 604 launch secondary games for players whose gaming terminal is in a particular area of the casino (e.g., the main floor).

During stage three, the presentation coordinator 604 launches secondary wagering game units 606 and 610. In some embodiments, the secondary wagering game units can facilitate a community wagering game in which all participants play a single community game. During stage four, the secondary wagering game units 606 & 610 present wagering game results on the wagering game terminals 616 & 614. After the secondary game event is complete, the presentation coordinator 604 can terminate the secondary wagering game units 606 & 610. However, the master secondary game unit 602 can remain active in the wagering game server 618, waiting for a condition to trigger another secondary gaming session.

Figure 7:
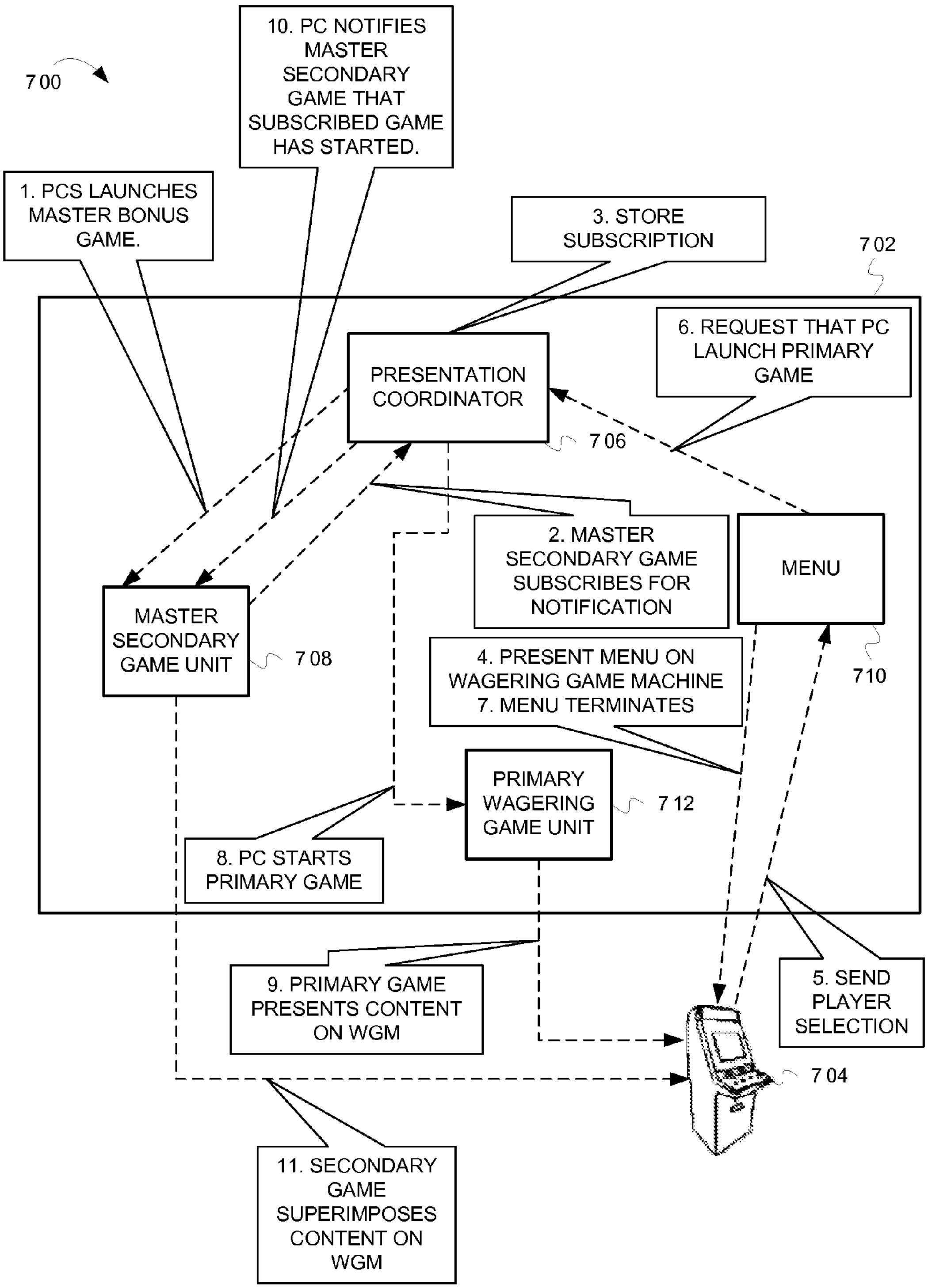
FIG. 7 is a block diagram illustrating components and operations for superimposing secondary wagering game content over primary content, according to some embodiments of the invention.
Figure 8:
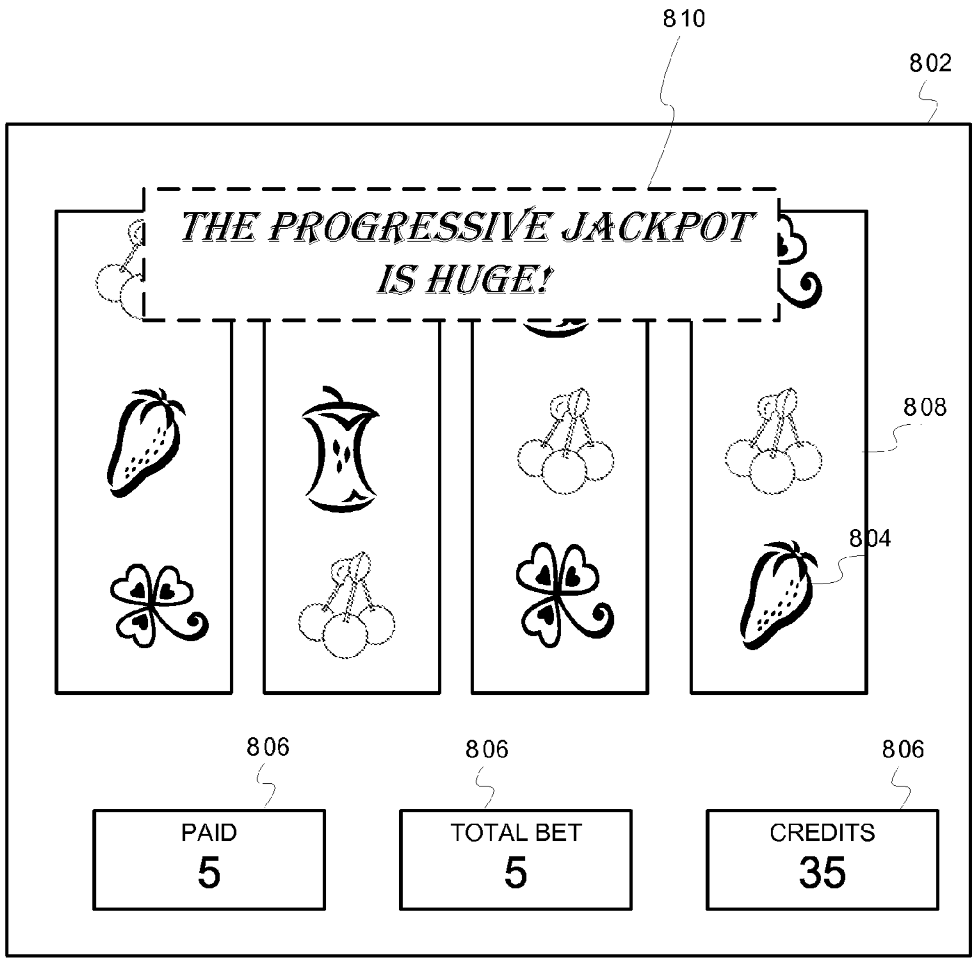
FIG. 8 is a block diagram illustrating how a wagering game can superimpose content over another wagering game's content.

As described above, wagering game units executing on the wagering game server can present content via the terminal's I/O facilities. FIGS. 7 & 8 describe how the system can superimpose content for a secondary game over a primary game's content.

FIG. 7 is a block diagram illustrating components and operations for superimposing secondary wagering game content over primary content, according to some embodiments of the invention. In FIG. 7, the system 700 includes a wagering game server 702 and wagering game terminal 704. The wagering game server 702 includes a master secondary game unit 708, primary wagering game unit 712, and menu 710. Before describing the operations shown in FIG. 7, this discussion will digress to FIG. 8.

FIG. 8 is a block diagram illustrating how a wagering game can superimpose content over another wagering game's content. In FIG. 8, a graphical user interface 802 includes a plurality of game elements (804 & 808) used for presenting results of a primary wagering game. The game elements include slots reels 808 and reel symbols 804. The graphical user interface 802 also includes meters 806 for presenting wager information. Typically, a primary wagering game presents its game elements without other content superimposed over its game elements. However, some embodiments of the invention enable games to superimpose content, heightening player interest and increasing entertainment value. When a secondary wagering game superimposes content over a primary game's content, the secondary game's content may cover some of the primary game's game elements. In FIG. 8, the superimposed content 808 covers some of the slots reels 808 and reel symbols 804. The superimposed content 810 can convey a message about another wagering game. For example, in FIG. 8, the superimposed content 810 indicates that a secondary progressive game's jackpot is very big. The superimposed content 810 can include other messages or indicia associated with other wagering games. The discussion will turn back to FIG. 7 for more discussion about components and operations that facilitate superimposing wagering game content.

In FIG. 7, the operations occur in eleven stages. During stage one, the presentation coordinator 706 launches a master secondary game unit 708. During stage two, the master secondary game unit 708 subscribes for notifications from the presentation coordinator 706. The notifications can indicate selections made by players at the wagering game terminal 704 (e.g., choice of wagering game, wagers, etc.). During stage three, the presentation coordinator 706 stores the subscription information.

During stage four, a menu 710 presents wagering game options on the wagering game terminal 704. The wagering game options can include selections for a number of wagering games (e.g., blackjack, slots, video poker, etc.) available for play on the wagering game terminal 704. During stage five, the wagering game terminal 704 transmits a player selection to the menu 710. The player selection can indicate a wagering game selected by the player. During stages six and seven, the menu 710 requests that the program coordinator 706 launch a particular primary wagering game and the menu terminates. During stage eight, the presentation coordinator 706 launches the primary wagering game unit 712.

During stage nine, the primary wagering game unit 712 presents wagering game content on the wagering game terminal 704. For example, the primary wagering game unit 712 begins accepting wagers and presenting content for a slots game on the terminal 704.

During stage 10, the presentation coordinator 706 notifies the master secondary game unit 708 that the primary wagering game unit 712 has begun conducting a wagering game. In response to the notification (during stage 11), the master secondary game unit 706 superimposes content over the primary wagering game unit's content. For example, as show in FIG. 8, the master secondary game unit 708 superimposes a message over elements defining the primary wagering game unit's slots game. In some embodiments, the superimposed content can include a menu or other means (e.g. a buy-in menu) for enabling the player to participate in the secondary game. Alternatively, instead of the master secondary game unit 708 itself superimposing content, it can spawn a slave secondary game (not shown) that superimposes and presents content. When numerous primary game units are executing on the server 702, the master unit 708 can create a slave unit for each primary game unit.

Although FIG. 7 describes embodiments in which a secondary wagering game unit superimposes content over primary game content, some embodiments enable primary game units to superimpose content over other primary game content. In such embodiments, the presentation coordinator 706 can launch a primary wagering game unit that subscribes to receive notifications about other primary wagering games. When the primary wagering game unit learns of certain events, it can superimpose content over other games.

This section continues with a discussion about operations for presenting a secondary wagering game and updating credit meters for primary and secondary wagering games.

Even though some primary and secondary wagering games are presented independently, players often view them as being closely related. For example, during a gaming session, both primary and secondary games typically include content on the same terminal. Thus, to avoid confusion about wagers and awards, embodiments of the invention enable primary and secondary games to independently update their credit meters to show a consistent credit balance. For example, if a primary game funds a secondary game that has a winning event, the system can update the secondary game's credit meter to show the winning event and the primary game's credit meter to reflect an increase in the game session balance.

Figure 9:
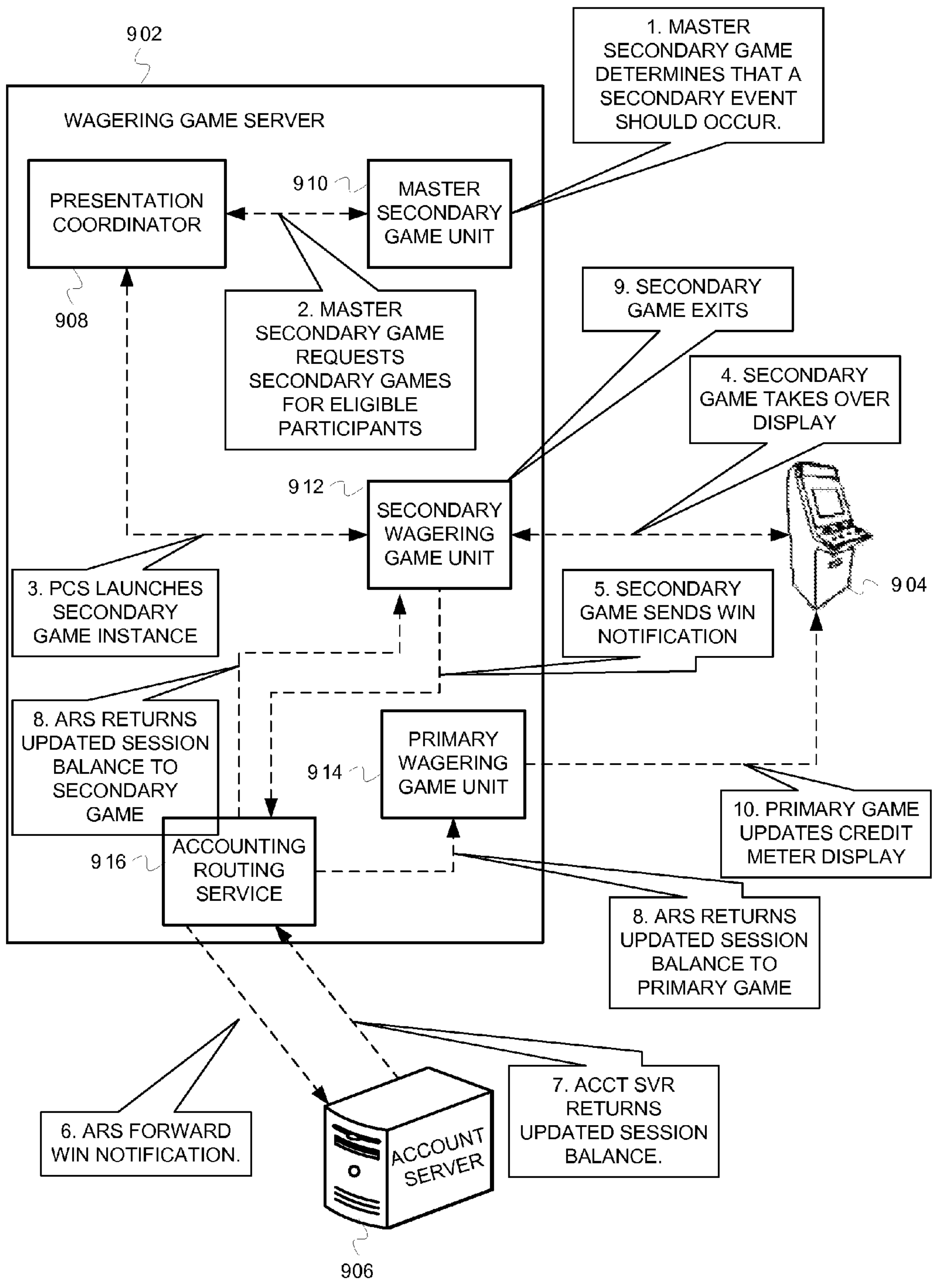
FIG. 9 is a block diagram illustrating components and operations for updating, after a winning event, credit meters associated with a primary and secondary wagering game, according to some embodiments of the invention.

FIG. 9 is a block diagram illustrating components and operations for updating, after a winning event, credit meters associated with a primary and secondary wagering game, according to some embodiments of the invention. In FIG. 9, the system 900 includes a wagering game server 902, wagering game terminal 904, and account server 906. The wagering game server 902 includes a presentation coordinator 908, master secondary game unit 910, secondary wagering game unit 912, primary wagering game unit 914, and accounting routing service 916. As per the discussion below, the secondary wagering game unit 912 is not initially active. Also, for clarity, FIG. 9 shows only one primary wagering game unit 914 and one secondary wagering game unit 912. However, the wagering game server 902 can launch numerous instances of the primary and secondary wagering game units (e.g., enough to utilize all wagering game terminals in a large casino).

The components of the system 900 perform operations in nine stages. During stage one, the master secondary game unit 910 detects an event that triggers a secondary wagering game. Events that trigger a secondary wagering game can include wager amounts on a terminal bank above or below a threshold amount, certain players playing on the system 900, time of day, social networking parameters (e.g., social contacts of players on the system 900), etc. During stage two, the master secondary game unit 910 requests that the presentation coordinator 908 launch an instance of the secondary wagering game unit 912. In some embodiments, the presentation coordinator 908 can launch a number of instances to allow a number of players to participate in a community-style wagering game. During stage three, the presentation coordinator 908 launches the requested secondary wagering game unit 912.

During stage four, the secondary wagering game unit 912 receives information identifying a wagering game terminal 904 and the secondary wagering game unit 912 begins presenting content (e.g., results) on the terminal 904. At that point, although the primary wagering game unit 914 is not presenting content on the terminal 904, it remains active (i.e., resident in memory) in the wagering game server 902. As shown, the secondary wagering game unit 912 operates independently of the primary wagering game unit 914.

During stage five, the secondary wagering game unit 912 calculates a winning award amount and sends a win notification to the accounting routing service 916. During stage six, the accounting routing service 916 forwards the win notification to the account server 906. During stage seven, the account server 906 credits the player's account and returns an updated session balance to the accounting routing service 916. During stage eight, the accounting routing service 916 forwards the updated session balance to the secondary wagering game unit 912, which presents the updated session balance on its credit meter. Also, the accounting routing service 916 determines that the secondary wagering game unit 912 was funded by a wager associated with a game presented by the primary wagering game unit 914. As a result, the accounting routing service 916 also forwards the updated session balance to the primary wagering game unit 914.

During stage nine, the secondary wagering game unit 912 terminates, as it has presented its results and processed the wagers and awards. At this point, the primary wagering game unit 914 retakes control of the terminal's display facilities. During stage 10 the primary wagering game unit 914 updates its credit meter to reflect the new session balance. As a result, both the primary and secondary wagering games can update their credit meters to reflect the award.

More About Wagering Game Terminals

As noted above, the wagering game terminals can be thick or thin client devices. In some embodiments, the wagering game terminals can include logic for operating in concert with wagering game servers and/or working in a standalone mode (e.g., game results determined on the terminal). The discussion of FIGS. 10 and 11 describe some embodiments of a wagering game terminal.

Figure 10:
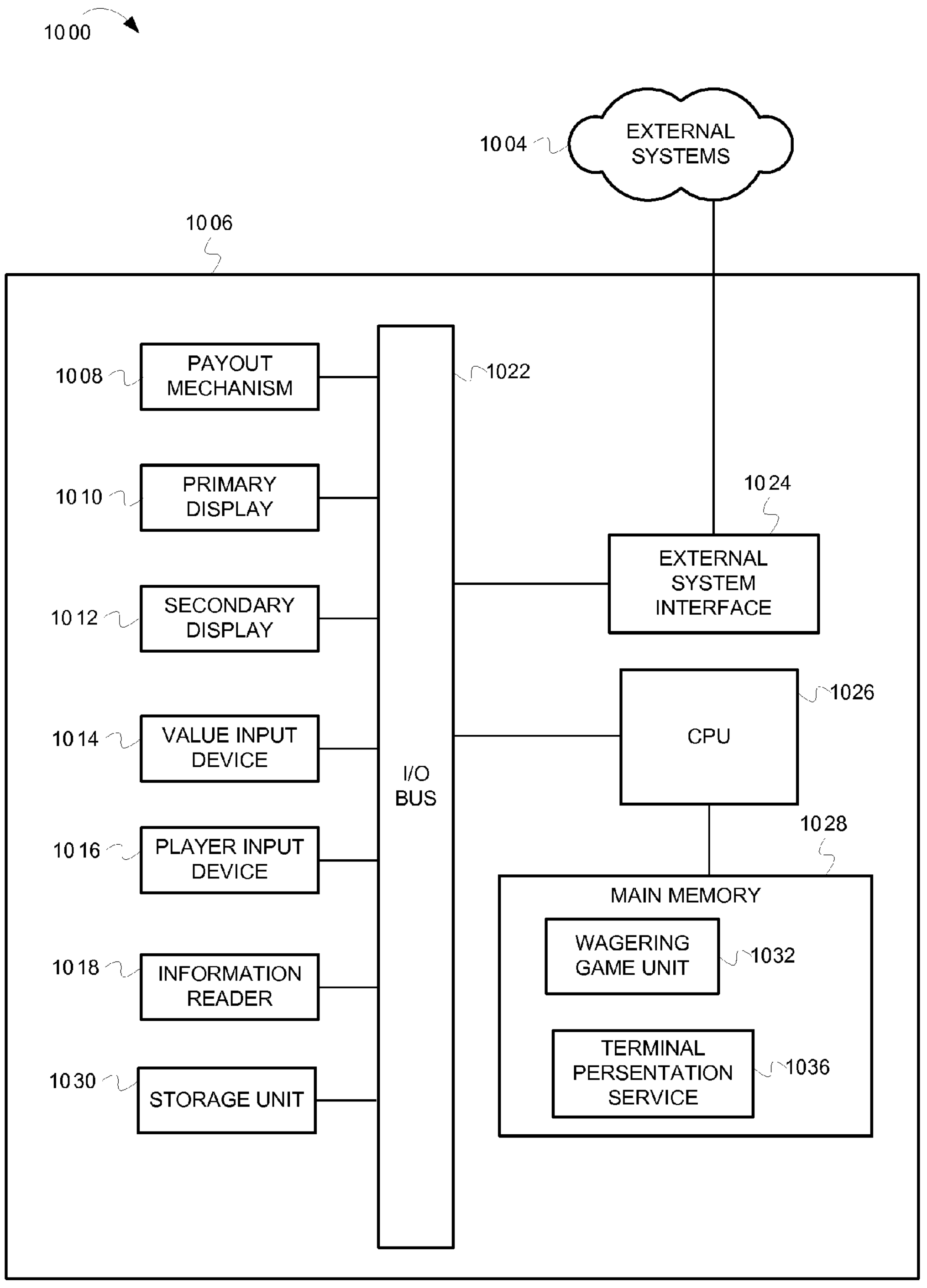
FIG. 10 is a block diagram illustrating a wagering game machine architecture, according to example embodiments of the invention.

FIG. 10 is a block diagram illustrating a wagering game machine architecture, according to example embodiments of the invention. As shown in FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032 and terminal presentation service 1036. In some embodiments, the wagering game unit 1032 can present wagering games, such as video poker, video black jack, video slots, video lottery, etc., in whole or part. In some embodiments, the terminal presentation service 1036 receives wagering game content from a wagering game server and presents the content on its display devices.

The CPU 1026 is also connected to an input/output (I/O) bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems 1004 (e.g., wagering game networks).

In one embodiment, the wagering game machine 1006 can include additional peripheral devices and/or more than one of each component shown in FIG. 10. For example, in one embodiment, the wagering game machine 1006 can include multiple external system interfaces 1024 and/or multiple CPUs 1026. In one embodiment, any of the components can be integrated or subdivided.

Any component of the architecture 1000 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 10 describes an example architecture, the discussion continues with more details about some embodiments of a wagering game terminal.

Figure 11:
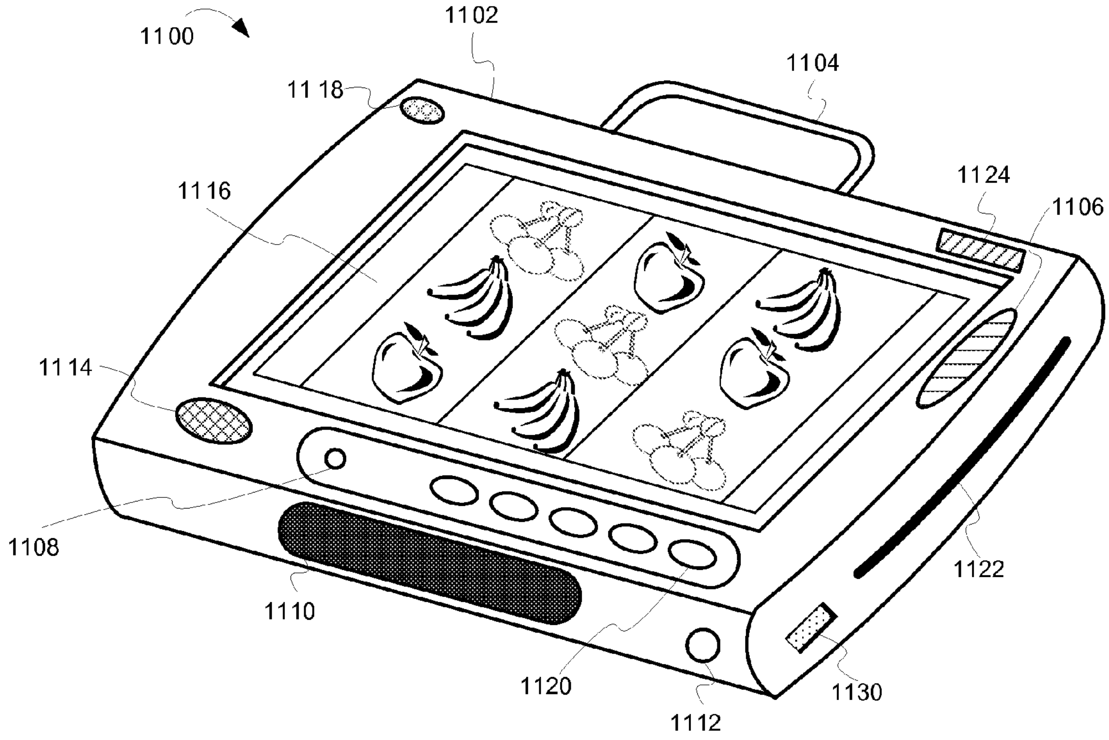
FIG. 11 is an illustration of a mobile wagering game terminal, according to some embodiments of the invention.

FIG. 11 is an illustration of a mobile wagering game terminal, according to some embodiments of the invention. In FIG. 11, the mobile wagering game terminal 1100 includes a housing 1102 for containing internal hardware and/or software, such as that described above. In one embodiment, the housing has a form factor similar to a tablet PC, while other embodiments have different form factors. For example, the mobile wagering game terminal 1100 can exhibit smaller form factors, similar to those associated with personal digital assistants. In one embodiment, a handle 1104 is attached to the housing 1102. Additionally, the housing can store a foldout stand 1110, which can hold the mobile wagering game terminal 1100 upright or semi-upright on a table or other flat surface.

The mobile wagering game terminal 1100 includes several input/output devices. In particular, the mobile wagering game terminal 1100 includes buttons 1120, audio jack 1108, speaker 1114, display 1116, biometric device 1106, wireless transmission devices 1112 and 1124, microphone 1118, and card reader 1122. Additionally, the mobile wagering game terminal can include tilt, orientation, ambient light, or other environmental sensors.

In one embodiment, the mobile wagering game terminal 1100 uses the biometric device 1106 for authenticating players, whereas it uses the display 1116 and speakers 1114 for presenting wagering game results and other information (e.g., credits, progressive jackpots, etc.). The mobile wagering game terminal 1100 can also present audio through the audio jack 1108 or through a wireless link such as Bluetooth.

In one embodiment, the wireless communication unit 1112 can include infrared wireless communications technology for receiving wagering game content while docked in a wager gaming station. The wireless communication unit 1124 can include an 802.11G transceiver for connecting to and exchanging information with wireless access points. The wireless communication unit 1124 can include a Bluetooth transceiver for exchanging information with other Bluetooth enabled devices.

In one embodiment, the mobile wagering game terminal 1100 is constructed from damage resistant materials, such as polymer plastics. Portions of the mobile wagering game terminal 1100 can be constructed from non-porous plastics which exhibit antimicrobial qualities. Also, the mobile wagering game terminal 1100 can be liquid resistant for easy cleaning and sanitization.

In some embodiments, the mobile wagering game terminal 1100 can also include an input/output ("I/O") port 1130 for connecting directly to another device, such as to a peripheral device, a secondary mobile terminal, etc. Furthermore, any component of the mobile wagering game terminal 1100 can include hardware, firmware, and/or machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which is defined only by the appended claims. Each of the embodiments described herein are contemplated as falling within the inventive subject matter, which is set forth in the following claims.

The invention claimed is:

1. A method comprising:

detecting, in a wagering game server, a first winning event associated with a first wagering game appearing on a remote wagering game terminal, wherein the first wagering game is for a single player, wherein the first winning event indicates a first monetary award, and wherein a first credit meter is associated with the first wagering game;

detecting, in the wagering game server, a second winning event associated with a second wagering game, wherein the second wagering game appears on the remote wagering terminal during a portion of the first wagering game, wherein the second wagering game is for the single player, wherein the second winning event indicates a second monetary award, and wherein a second credit meter is associated with the second wagering game and not associated with the first wagering game;

transmitting, to an account server, indications of the first monetary award and the second monetary award;

receiving, from the account server, new values for the first credit meter and the second credit meter, wherein the first credit meter and second credit meter appear on the remote wagering game terminal; and transmitting content to display the new values on the remote wagering game terminal.

2. The method of claim 1, wherein the first credit meter indicates wagers made and wagers won for the first wagering game, and wherein the second credit meter indicates wagers made and wagers won for the second wagering game.

3. The method of claim 1, wherein the content includes the new values.

4. The method of claim 1, wherein the accounting server determines the new values.

5. The method of claim 1, wherein the remote wagering game terminal includes components for processing the content and displaying the new values.

6. A non-transitory computer-readable storage device including instructions, which when executed by one or more processors, cause the one or more processors to perform operations comprising:

detecting, in a wagering game server, a first winning event associated with a first wagering game appearing on a remote wagering game terminal, wherein the first wagering game is for a single player, wherein the first winning event indicates a first monetary award, and wherein a first credit meter is associated with the first wagering game;

detecting, in the wagering game server, a second winning event associated with a second wagering game, wherein the second wagering game appears on the remote wagering terminal during a portion of the first wagering game, wherein the second wagering game is for the single player, wherein the second winning event indicates a second monetary award, and wherein a second credit meter is associated with the second wagering game and not associated with the first wagering game;

transmitting, to an account server, indications of the first monetary award and the second monetary award;

receiving, from the account server, new values for the first credit meter and the second credit meter, wherein the first credit meter and second credit meter appear on the remote wagering game terminal; and transmitting content to display the new values on the remote wagering game terminal.

7. The tangible computer-readable storage device of claim 6, wherein the first credit meter indicates wagers made and wagers won for the first wagering game, and wherein the second credit meter indicates wagers made and wagers won for the second wagering game.

8. The tangible computer-readable storage device of claim 6, wherein the content includes the new values.

9. The tangible computer-readable storage device of claim 6, wherein the accounting server determines the new values.

10. The tangible computer-readable storage device of claim 6, wherein the remote wagering game terminal includes components for processing the content and displaying the new values.

11. An apparatus comprising:

at least one processor;

at least one non-transitory computer-readable storage device including program code, which when executed by the at least one processor, cause the at least one processor to perform operations comprising:

operations to detect, in a wagering game server, a first winning event associated with a first wagering game appearing on a remote wagering game terminal, wherein the first wagering game is for a single player, wherein the first winning event indicates a first monetary award, and wherein a first credit meter is associated with the first wagering game;

operations to detect, in the wagering game server, a second winning event associated with a second wagering game, wherein the second wagering game appears on the remote wagering terminal during a portion of the first wagering game, wherein the second wagering game is for the single player, wherein the second winning event indicates a second monetary award, and wherein a second credit meter is associated with the second wagering game and not associated with the first wagering game;

operations to transmit, to an account server, indications of the first monetary award and the second monetary award;

operations to receive, from the account server, new values for the first credit meter and the second credit meter, wherein the first credit meter and second credit meter appear on the remote wagering game terminal; and operations to transmit content to display the new values on the remote wagering game terminal.

12. The apparatus device of claim 10, wherein the first credit meter indicates wagers made and wagers won in the first wagering game, and wherein the second credit meter indicates wagers made and wagers won in the second wagering game.

13. The apparatus device of claim 10, wherein the content includes the new values.

14. The apparatus device of claim 10, wherein the accounting server determines the new values.

15. The apparatus device of claim 10, wherein the remote wagering game terminal includes components for processing the content and displaying the new values.

* * * * *